United States Patent [19]

Thompson

[11] 4,438,727

[45] Mar. 27, 1984

[54] MOBILE TOY FOR KITTEN OR SIMILAR ANIMAL

[76] Inventor: Kenneth H. Thompson, 4613 Saul Rd., Kensington, Md. 20895

[21] Appl. No.: 341,794

[22] Filed: Jan. 22, 1982

[51] Int. Cl.³ .............................................. A01K 29/00
[52] U.S. Cl. ......................................... 119/29; 46/32
[58] Field of Search .................. 119/29, 29.5; 46/1 R, 46/32

[56] References Cited

U.S. PATENT DOCUMENTS

| | | | |
|---|---|---|---|
| 810,900 | 1/1906 | Bartlett | 46/32 |
| 2,769,276 | 11/1956 | Steiner | 46/32 |
| 2,994,156 | 8/1961 | Steiner et al. | 46/32 |
| 3,312,195 | 4/1967 | Rohena | 119/29 |
| 3,456,158 | 8/1969 | Mitchell, Jr. | 119/29 |

*Primary Examiner*—Jay N. Eskovitz
*Attorney, Agent, or Firm*—Epstein & Edell

[57] ABSTRACT

A mobile unit for a kitten or similar animal includes at least two freely suspended rods, one of which is suspended from the other, with unequal torques applied about their off-center suspension points so that both rods, at rest, are skewed relative to horizontal. Pulling, tugging or otherwise disturbing a toy-like member, suspended from the lower rod, causes both rods to dip and bob irregularly in addition to rotating. This compound irregular motion, in both horizontal and vertical planes, is translated to the toy-like member with the result that the cat or other animal is attracted thereto. The mobile unit may be suspended from a door-way and the applied torques and suspension lengths may be made adjustable.

20 Claims, 6 Drawing Figures

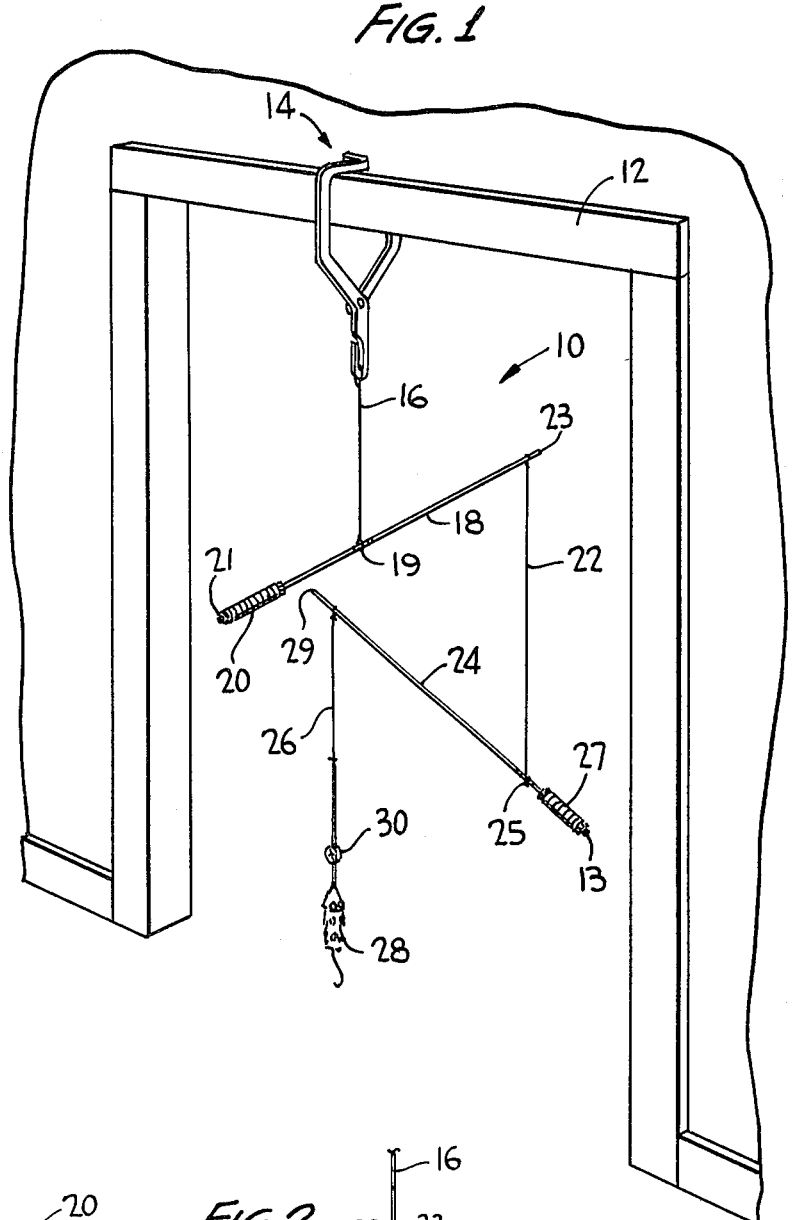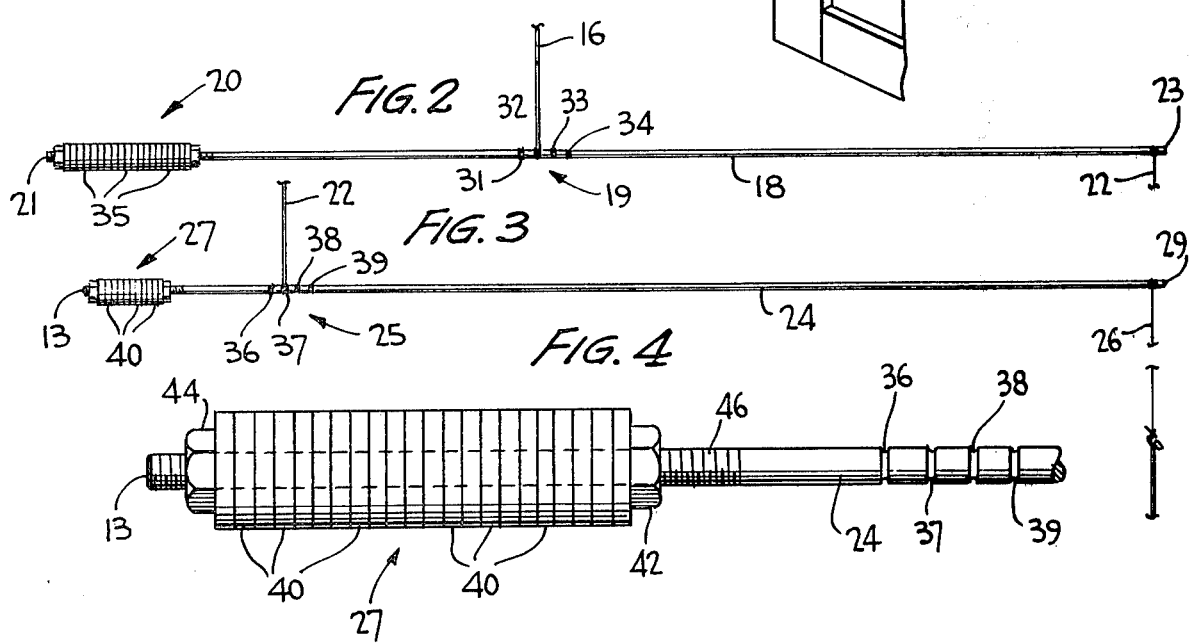

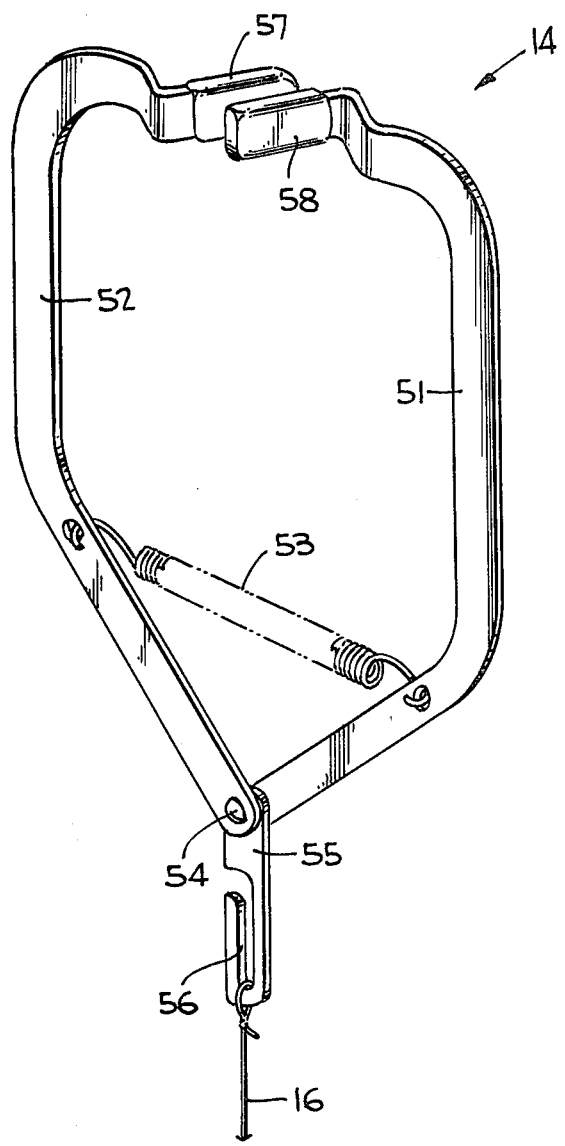
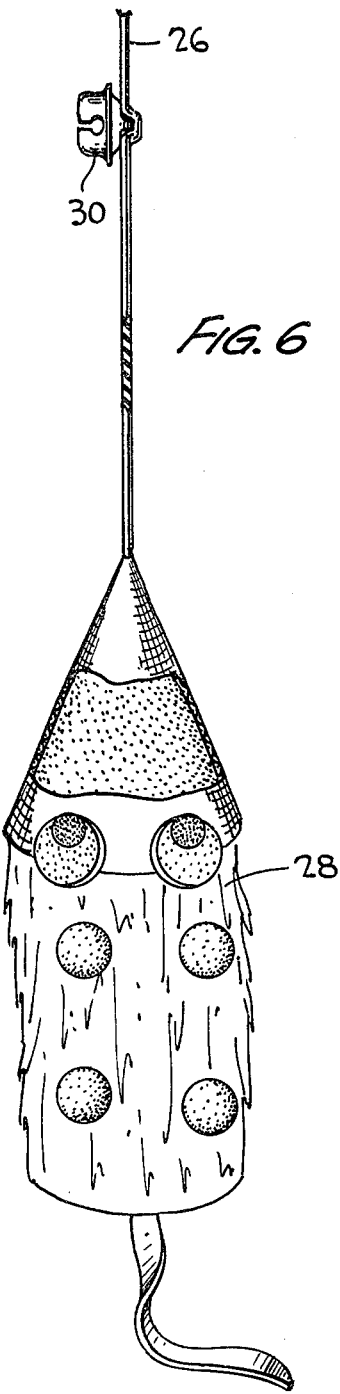

MOBILE TOY FOR KITTEN OR SIMILAR ANIMAL

TECHNICAL FIELD

The present invention relates to toys or play things for kittens or similar animals or even children and, more particularly, to a mobile type toy designed to retain the interest of a kitten.

BACKGROUND OF THE INVENTION

Mobile-type toys are well known in the prior art. Generally such toys include one or more support bars which are vertically suspended at a point along the bars the weighted with balanced net torques so that each bar, when undisturbed, remains horizontal. Disturbance of items suspended from such a bar, causes the bar to primarily rotate about its suspension axis. Any concomitant movement in the vertical plane manifests itself as a regular see-saw type of movement due to the balanced torques produced by the suspended weighted items. This type of structure, with the resultant movement upon disturbance, may be satisfactory to hold the interest of a child or to present a desirable ornamental appearance; however, this type of movement does not retain the interest of an animal such as a kitten, for any extended period of time. On the contrary, kittens and other such animals tend to be fascinated by irregular bouncing type movements and the like.

SUMMARY OF THE INVENTION

It is an object of the present invention to provide a mobile toy which, when disturbed, exhibits an irregular bouncing-type movement so as to attract a kitten, or the like.

It is another object of the present invention to provide an improved mobile-type toy which, when disturbed, exhibits a complex irregular three-dimensional movement pattern, combining both horizontal irregular three-dimensional movement pattern, combining both horizontal and vertical components.

It is another object of the present invention to provide a mobile-type toy of the type described which can be readily suspended at various heights and at various orientations.

In accordance with the present invention, a mobile toy includes at least two freely suspended rods, one of which is suspended from the other. The rods support weights which are selected to provide unequal gravitational torques along the support rod about the rod suspension point so that each rod, at rest, is positioned skewed relative to the horizontal plane. In the preferred embodiment, the mobile toy includes a gripping member which is adapted to engage the top of a door frame so that the mobile toy is suspended within the door frame. A string or cable is connected to the gripping member and supports a first rod which has a weight connected proximate one end and a further support string or cable connected proximate its second end. The second support string supports the second rod which is likewise weighted proximate one end and has a toy, or the like, suspended proximate its second end. The two rods are supported off-center and the weighted ends of the rods, due to the unbalanced torques about the rod suspension points, are positioned at a lower level than the opposite ends. When the suspended toy-like member is pulled, pushed, or otherwise disturbed, the motion is transmitted through the support strings to each of the rods which tend to both rotate about their suspension axes and bob up and down irregularly about their suspension points. The off-center position of the suspension points provides for a relatively large arc of movement at the end of each long rod section. The weights attached to the rods and the lengths of the support strings may be adjustable.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein:

FIG. 1 is a view in perspective showing the mobile toy of the present invention suspended from a door frame;

FIG. 2 is a view in plan of one of the support rods of the mobile toy of FIG. 1;

FIG. 3 is a view in plan of the other of the support rods of the mobile toy of FIG. 1;

FIG. 4 is a detailed view in plan of the weighted end portion of the rod of FIG. 3;

FIG. 5 is a view in perspective of the gripping member used to support the mobile toy of FIG. 1; and FIG. 6 is a view of the suspended toy-like member connected at the lower extremity of the mobile toy of FIG. 1.

DESCRIPTION OF THE PREFERRED EMBODIMENTS

Referring to the drawings in greater detail, a mobile toy 10 is adapted to be suspended from a horizontally extending portion 12 of a door frame. The toy includes a gripping member 14 from which a string or cable 16 hangs suspended in the doorway. String 16 is secured to a support point 19 of a support rod 18. Support point 19 is positioned intermediate the two ends 21, 23 of rod 18, off-center, in accordance with criteria described hereinbelow. A weighted element 20 is secured proximate end 21 of rod 18; a further string 22 is suspended from a location proximate the other end 23 of the rod. A second support rod 24 is suspended off-center from string 22 at support point 25. Rod 24 includes a first end 13 and a second end 29, with support point 25 being disposed intermediate the two ends. A weighted member 27 is secured to rod 24 proximate end 13; a further string 26 is suspended from rod 24 proximate the second end 29. A toy-like member, preferably in the shape of a toy-mouse 28, is suspended from string 26. A string length adjustment member 30 is interposed in string 26 to commit the height at which toy-like member 28 is suspended to be adjusted.

As illustrated in FIG. 1, the off-center location of support point 19 on rod 18, and the weight elements supported by string 22, are selected so that the rod, when in its static or undisturbed state, is oriented skewed relative to a horizontal reference plane with end 21 disposed at a lower level than end 23. More specifically, the net gravitational torque applied along rod 18 about support point 19 is greater than the net gravitational torque applied along that rod about support point 19 by the total weight supported by string 22. In other words, the product of the weight of element 20 times the length of the rod section between support point 19 and end 21 exceeds the product of the weight supported by string 22 times the length of rod between support point 19 and end 23. This torque differential causes end 21 to fall while end 23 rises until the horizontal components of the torques balance out due to changes in the horizontal displacements of the weights from the support point 19. Similarly, support rod 24 in its static or undisturbed state is oriented with end 13 disposed at a lower level than end 29. This is achieved by selecting weight 27, the weight supported by string 26 and the location of support point 25 accordingly. More specifically, the net gravitational torque applied along rod 24 about support point 25 is selected to be greater than the net gravitational torque applied along support rod 24 about support point 25 by the total weight of string 26, element 28 and adjustment member 30. The unequally applied torques about the rod support points, which cause the rod to be statically skewed relative to the horizontal, result in an erratic, complex movement of the rods when the toy 28 is pulled, pushed, tugged, or otherwise disturbed. More specifically, the rods exhibit an irregular complex movement including a rotation about their support axes, and an irregular bobbing and dipping effect caused by cyclical pivoting with horizontal and vertical components about their support points.

Referring specifically to FIG. 2, the location of the support point 19 is rendered adjustable by providing annular notches 31, 32, 33, 34 at axially spaced locations along rod 18. String 16 is secured to one of these notches, depending upon the selected location of the support point for a given application. Weight member 20 is illustrated as comprising a plurality of sequentially abutting and axially aligned washers 35. As described below, washers 35 can be selectively removed or added to change the weight of member 20. It is seen, therefore, that the net torque applied by weight member 20 can be changed by varying the number of washers or by changing the location of support point 19.

Referring now to FIG. 3 with greater specificity, support point 25 is likewise adjustable by the provision of axially spaced annular grooves 36, 37, 38 and 39. String 22 may be attached to rod 24 at any of these notches or grooves so as to vary the location of support point 25. Weight member 27 is illustrated as comprising a plurality of washers 40 similar to washers 35. By varying the number of washers attached to rod 24, or by varying the location of support point 25, the net torque applied along rod 24 by weight member 27 can be adjusted.

Referring now to FIG. 4 in greater detail, the washers 40 comprising weight member 27 are shown in an enlarged view. The end 13 of rod 24 to which washers 40 are attached is illustrated as being externally threaded. The annular washers 40 are secured in place along the threaded portion 46 of rod 24 between two threaded nut members 42 and 44 which threadedly engage the threaded portion 46 of rod 24. The washers are axially compressed by tightening the nut members 42 and 44 toward one another so as to hold the washers 40 in place.

Referring now to FIG. 5 of the accompanying drawings, a gripping member 14 is illustrated in detail and includes two mutually facing C-shaped members 51 and 52 which are pivotally engaged by means of a pivot pin 54 at respective ends thereof. A compression spring 53 extends between the two members 51, 52 by means of appropriately provided holes in these members so as to bias the opposite ends 57, 58 of the members toward one another. A suspension bar 55 is suspended from pivot pin 54 and include a slotted portion 56 to which string or cable 16 may be tied or otherwise secured. Frame members 51 and 52 form a resilient jaw or grip which permits the ends 57 and 58 to be forced apart, in opposition to the bias spring 53 so as to permit the gripping member to be inserted over the horizontal member 12 of the door frame of FIG. 1. When the ends 57, 58 of the frame members clear the door frame member 12, the tension on the members 51, 52 is relaxed to permit the ends 57 and 58 to engage the wall portion above the frame member 12. The upper ledge of frame member 12 prevents gripping member 14 from sliding past the frame member 12 so that the mobile unit may be suspended in the doorway.

Referring specifically to FIG. 6, the toy-like member 28, in the form of a fanciful looking mouse, is shown suspended from string 26. String 26 passes through the adjustment member 30 and can be wrapped about that member as many times as necessary to shorten the length of string 26 and thereby adjust the height above the floor to which toy-like member 28 is suspended.

It should be noted that the weighted members 20, 27 need not be adjustable and, therefore, can be decorative items suspended from their respective support rods. However, in the preferred embodiment, it is intended that the weighted members be adjustable, by any means, and preferably by the addition or subtraction of washers.

It should further be noted that the mobile unit described and illustrated herein need not be limited to two support rods 18, 24. On the contrary, additional support rods, preferably with unbalanced applied torques, can be interposed between these support rods to provide additional complex movement of the entire unit and, ultimately, the suspended toy-like member 28.

It should further be noted that the location of the weighted members 20, 27 and strings 22, 26 at the ends of the various rods is part of the preferred embodiment only; that is, the location of the applied weights to the various support rods can be varied so long as the net applied torques along each rod are not equal. More specifically, the unequal torques are required so that the support rods are skewed relative to the horizontal in their static or undisturbed condition.

While I have described and illustrated a specific embodiment of my invention, it will be clear that variations of the details of construction which are specifically illustrated and described may be resorted to without departing from the true spirit and scope of the invention as defined in the appended claims.

What I claim is:

1. A mobile comprising:
  a first rod having first and second ends and a longitudinal center;
  first support means for freely suspending said first rod at a first support point located intermediate said first and second ends and displaced from said longitudinal center;
  first weighted means secured to said first rod for applying a first gravitational torque to said rod about said first support point;
  further means secured to said first rod for applying a second gravitational torque, of lesser value than said first gravitational torque, about said first support point;
  wherein said further means includes;
    a second rod having first and second ends and a longitudinal center;

second support means for freely suspending said second rod at a second support point located intermediate the ends of the second rod and displaced from the longitudinal center of said second rod;

second weighted means secured to said second rod for applying a third gravitational torque to said second rod about said second support point; and additional means secured to said second rod for applying a fourth gravitational torque, of lesser value than said gravitational torque, to said second rod about said second support point.

2. The mobile according to claim 1 wherein
said first weighted means is secured to said first rod proximate the first end of the first rod;
said further means is secured to said first rod proximate the second end of the first rod;
said second weighted means is secured to said second rod proximate the first end of the second rod; and
said additional means is secured to said second rod proximate the second end of the second rod.

3. The mobile according to claim 1 wherein said second support means is secured to said first rod proximate its second end and to said second rod at said second support point.

4. The mobile according to claim 1 wherein said first support means includes gripping means for selectively gripping a horizontally-extending part of a door frame, and wherein said first support means is secured to said gripping means and to the first support point of said first rod.

5. The mobile toy according to claim 1 wherein the weights of said first and second adjustable means are weighted.

6. The mobile according to claim 5 wherein said first and second weighted means each includes a plurality of washer members removably secured to their respective rods in sequentially abutting coaxial relation.

7. The mobile according to claim 6 further comprising means for selectively adjusting the length of at least one of said first and second support means.

8. The mobile according to claim 1 further including means for selectively adjusting the position of at least one of said first and second support points.

9. A mobile comprising:
a first rod having first and second ends;
first support means for suspending said first rod in a skewed position relative to horizontal when the first rod is unperturbed, said first support means including:
means suspending said first rod at a first support point which divides said first rod into first and second discrete longitudinal rod sections which extend inwardly from said first and second ends, respectively;
first mass means for applying a downwardly-directed force to said first rod section;
second mass means secured to and suspended from said second rod section;
wherein said second mass means comprises a second rod having first and second ends, and second support means for suspending said second rod in a skewed position relative to horizontal when the second rod is unperturbed, said second support means comprising:
means suspending said second rod at a second support point which divides the second rod at a second support point which divides the second rod into third and fourth discrete longitudinal rod sections which extend inwardly from said first and second ends, respectively, of said second rod; and
third mass means secured to and suspended from said third rod section.

10. The mobile according to claim 9 further comprising:
fourth mass means for applying a downwardly-directed force to said fourth rod section;
wherein said skewed position of said second rod is such that said third rod section is disposed higher than said fourth rod section.

11. The mobile according to claim 10 wherein said third mass means is suspended to a level below the level of said second end of said second rod in said skewed position of said second rod.

12. The mobile according to claim 11 wherein said skewed position of said first rod is such that said second end of said first rod is disposed higher than said first end of said first rod.

13. The mobile according to claim 11 wherein said third mass means comprises means for attracting an animal.

14. The mobile according to claim 11 wherein said third mass means is a toy which is adapted to be pulled upon to set the first and second rods in damped oscillatory pivotal motion about said first and second support points, respectively.

15. A mobile comprising:
a first rod;
first support means for suspending said first rod so as to be freely pivotable at least vertically about a first pivot point and in a skewed position relative to horizontal when unperturbed;
a second rod;
second support means for suspending said second rod from said first rod so as to be freely pivotable independently of said first rod at least vertically about a second pivot point and in a skewed position relative to horizontal when unperturbed, said second pivot point being disposed below said first pivot point; and
further means suspended from said second rod for permitting selective perturbation of said second rod.

16. The mobile according to claim 15 wherein said first support means includes means for suspending said first rod so as to be pivotable horizontally as well as vertically about said first pivot point; and wherein said second support means includes means for suspending said second rod so as to be pivotable horizontally as well as vertically about said second pivot point.

17. The mobile according to claim 16 wherein said second rod has first and second ends, and said second pivot point is spaced from the first end of said second rod by a distance greater than the distance between the second pivot point and the second end of said second rod.

18. The mobile according to claim 7 wherein said second rod, in its skewed unperturbed position, has its first end disposed above its second end.

19. The mobile according to claim 18 wherein said first pivot point in spaced from the first end of said first rod by a distance which exceeds the distance between the first pivot point and the second end of said first rod.

20. The mobile according to claim 19 wherein said first rod, in its skewed unperturbed position, has its first end disposed above its second end.

* * * * *